US008416650B2

(12) United States Patent
Mori et al.

(10) Patent No.: US 8,416,650 B2
(45) Date of Patent: Apr. 9, 2013

(54) METHOD FOR DETECTING PROTRUSION HEIGHT OF MAGNETIC HEAD SLIDER HAVING THERMALLY ASSISTED HEAD

(75) Inventors: Takahiro Mori, Tokyo (JP); Satoshi Tomikawa, Tokyo (JP); Hiroshi Kiyono, Tokyo (JP)

(73) Assignee: TDK Corporation, Tokyo (JP)

( * ) Notice: Subject to any disclaimer, the term of this patent is extended or adjusted under 35 U.S.C. 154(b) by 67 days.

(21) Appl. No.: 13/212,604

(22) Filed: Aug. 18, 2011

(65) Prior Publication Data

US 2013/0044575 A1  Feb. 21, 2013

(51) Int. Cl.
*G11B 11/00* (2006.01)
*G11B 27/36* (2006.01)

(52) U.S. Cl.
USPC ............................. 369/13.33; 360/31; 360/25

(58) Field of Classification Search ............... 369/13.01, 369/70, 13.33, 13.13; 360/25, 75, 294.7, 360/31, 78.08, 59, 322, 320, 70, 46, 110, 360/324, 123.02, 53, 60, 51, 67; 702/133; 73/105; 700/110; 324/212; 385/129; 250/201.3
See application file for complete search history.

(56) References Cited

U.S. PATENT DOCUMENTS

| | | | | |
|---|---|---|---|---|
| 5,901,001 A | * | 5/1999 | Meyer et al. ..................... | 360/25 |
| 6,899,456 B2 | * | 5/2005 | Sundaram et al. ................ | 374/4 |
| 6,940,669 B2 | * | 9/2005 | Schaenzer et al. .............. | 360/25 |
| 7,457,069 B2 | * | 11/2008 | Yoshioka et al. ............... | 360/75 |
| 8,000,178 B2 | * | 8/2011 | Shimazawa et al. ....... | 369/13.33 |
| 2010/0103553 A1 | | 4/2010 | Shimazawa et al. | |
| 2011/0149706 A1 | * | 6/2011 | Duan et al. ................. | 369/53.41 |
| 2012/0206834 A1 | * | 8/2012 | Ueda et al. ..................... | 360/86 |

FOREIGN PATENT DOCUMENTS

JP    A-2003-168274    6/2003

* cited by examiner

*Primary Examiner* — Ali Neyzari
(74) *Attorney, Agent, or Firm* — Posz Law Group, PLC

(57) ABSTRACT

A magnetic head slider includes a near-field light generator, an incorporated heater is activated to thermally-expand the magnetic head slider so that a first protrusion is generated on the air bearing surface, and a second protrusion protruding from the first protrusion is generated by a thermal expansion of the near-field light generator. A standard signal is written to a recording medium with a predetermined magnetization. A relation between a residual magnetization of the standard signal and a power of the heater is obtained by lowering the magnetization of the standard signal by heating the recording medium with the near-field light while light output of laser light is maintained to be constant and the power of the heater is varied. Further, a relation between the first spacing and the residual magnetization is obtained. A value of the first spacing is obtained as a protrusion height of the second protrusion from the first protrusion when the second protrusion contacts the recording medium, the value of the first spacing being determined where an absolute value of a change rate of the residual magnetization is less than a predetermined standard value.

10 Claims, 9 Drawing Sheets

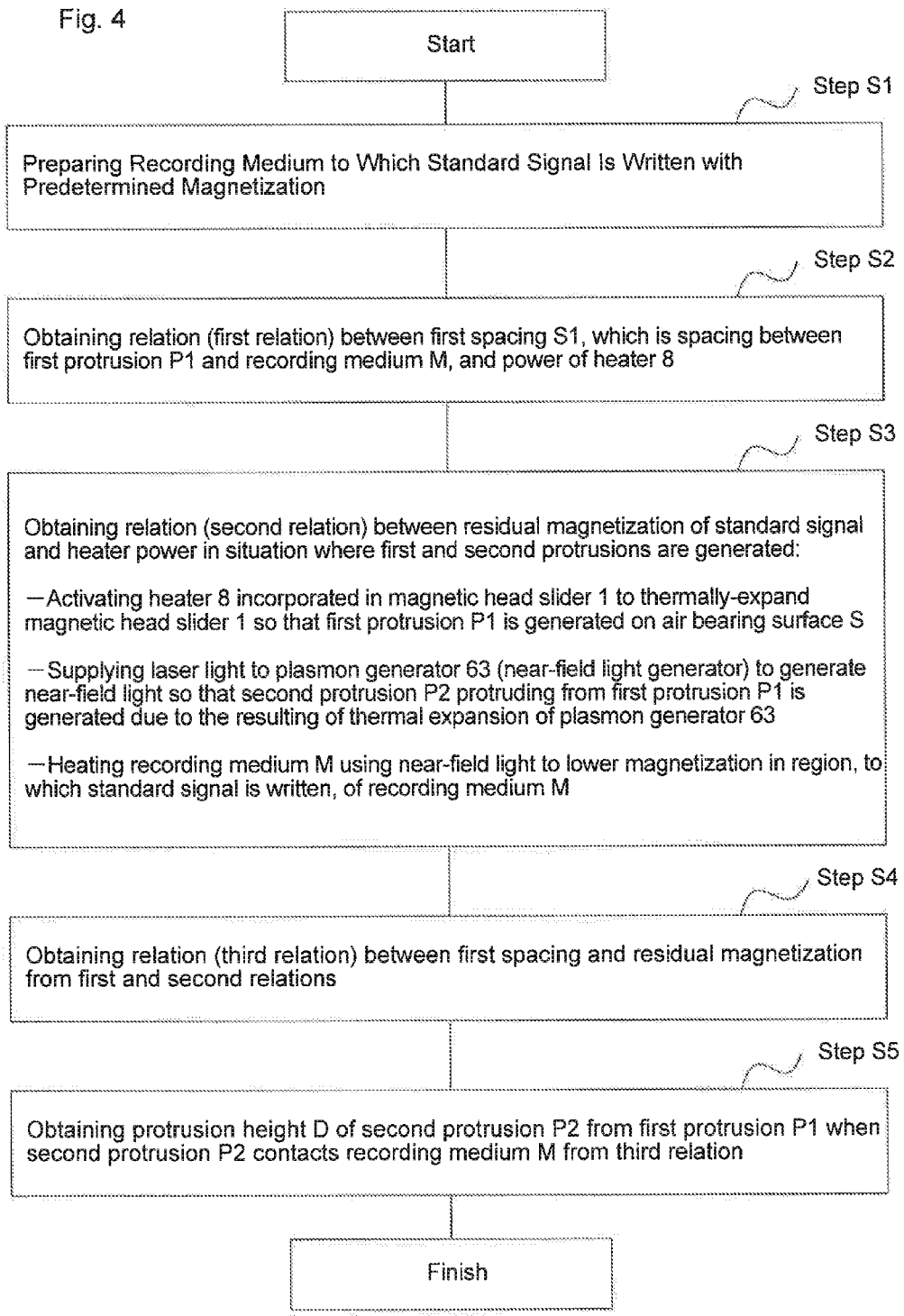

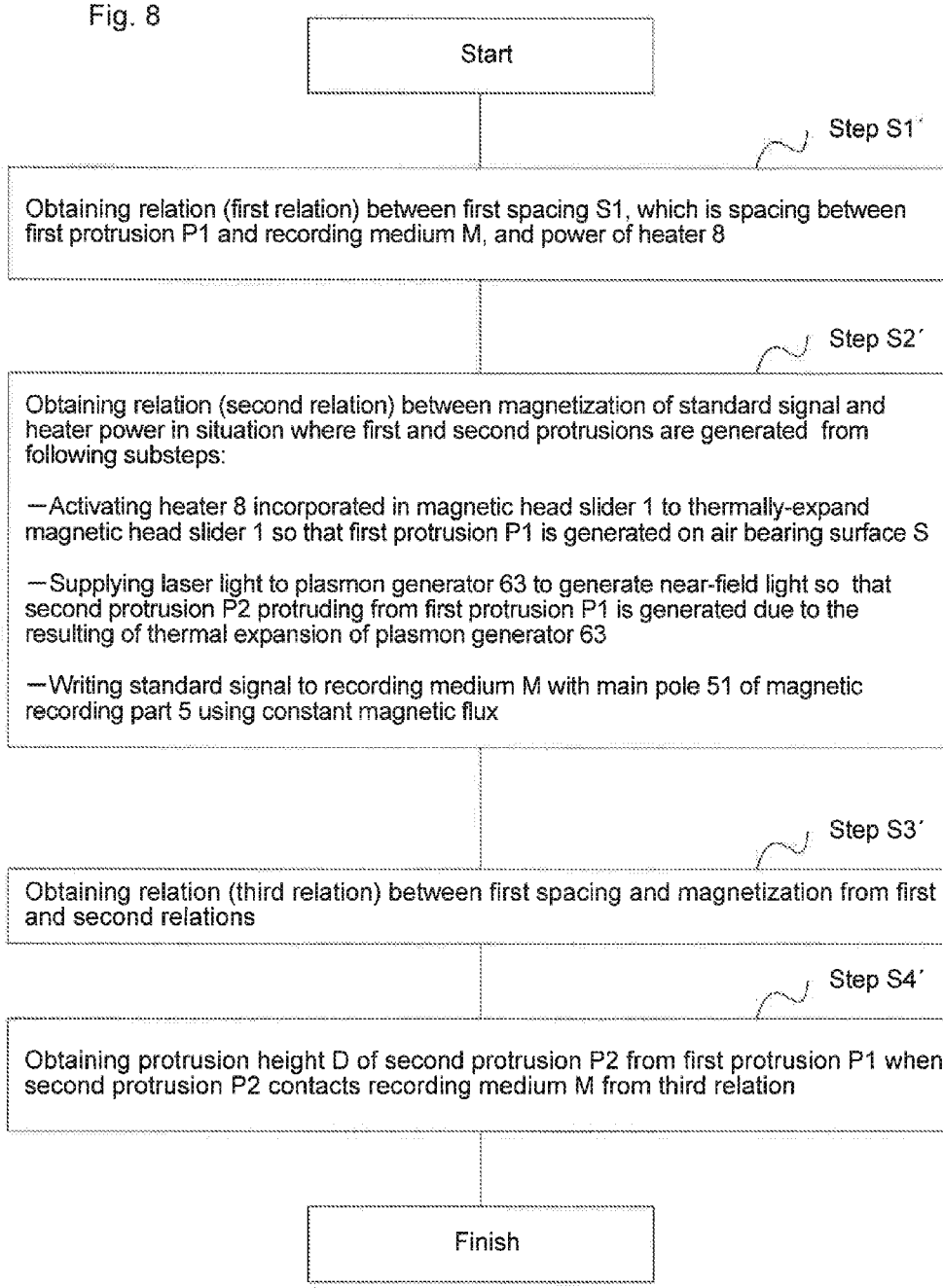

METHOD FOR DETECTING PROTRUSION HEIGHT OF MAGNETIC HEAD SLIDER HAVING THERMALLY ASSISTED HEAD

BACKGROUND OF THE INVENTION

1. Field of the Invention

The present invention relates to a method for detecting a protrusion height of an air bearing surface of a magnetic head slider including a thermally-assisted head.

2. Description of the Related Art

In accordance with higher recording density of hard disk devices, it is desired to diminish a gap between a magnetic head slider and a recording medium. In response to the desire, a magnetic head slider incorporating a heater is proposed as disclosed in JP Laid-Open Patent Publication No. 2003-168274. The heater is disposed near a magnetic recording part and a reproducing part of the magnetic head slider and expands the magnetic head slider by generating heat. Because a relatively wide area of the air bearing surface expands toward the recording medium, the distance from the magnetic recording part and the reproducing part to the recording medium diminishes.

When the distance from the magnetic recording part and the reproducing part to the recording medium is diminished by using the heater disclosed in the above-described publication and when power of the heater (or heater power) is excessively high, thermal expansion of the magnetic head slider becomes excessively large, and thereby the air bearing surface contacts the recording medium. Such contact damages both the recording medium and the magnetic head slider, and therefore the reliability and lifetime of the hard disk device may be degraded. Therefore, it is preferred that the distance from the magnetic recording part and the reproducing part to the recording medium is diminished within the range where the contact of the air bearing surface to the recording medium is preventable. It is known that the distance from the magnetic recording part and the reproducing part to the recording medium can be estimated from, for example, a value of an output voltage of the reproducing part.

On the other hand, for higher recording density of hard disk devices, a magnetic recording system that is called as a thermally-assisted magnetic recording is known. A recording medium that is used for magnetic recording is formed with a non-continuous recording medium made from magnetic microparticles, and each of the magnetic microparticles has a single magnetic domain structure. A recording region (each bit) is formed from a plurality of magnetic microparticles, and thereby boundaries between the recording regions are uneven. In order to increase the recording density, degree of the unevenness should be reduced. In order to achieve this, it is effective to reduce the magnetic microparticles in size; however, a thermal stability is deteriorated associated with a volume reduction of the magnetic microparticles when the magnetic microparticles are reduced in size. In order to enhance the thermal stability, it is preferred to use a magnetic material with a large magnetic anisotropy constant; however, on the other hand, it becomes difficult to record information because coercive force of the recording medium becomes large when anisotropy energy of the magnetic microparticles is increased. Accordingly, in the thermally-assisted magnetic recording, recording to the recording medium is performed in a state where the coercive force is reduced by simultaneously applying a magnetic flux and heat during recording.

U.S. Patent Publication Application No. 2010/0103553 discloses a thermally-assisted head provided with a surface-emitting laser diode and a plasmon generator. Laser light emitting from the laser diode enters into a core configuring a waveguide. The plasmon generator disposed along the core couples in a surface plasmon mode with propagation light propagating through the core at a portion opposing the core to generate surface plasmon. The generated surface plasmon propagates to an end part of the plasmon generator to generate near-field light on the air bearing surface. The coercive force of the recording medium is decreased by heating with the near-field light. In this state, the magnetic flux is supplied from a main pole of a magnetic recording part to the recording medium and thereby information is recorded to the recording medium.

The plasmon generator generates the near-field light in response to the supply of the laser light; however, since its generation efficiency is not 100%, thermal energy that does not contribute to generate the near-field light is partially consumed for heating the plasmon generator itself. As a result, the plasmon generator is heated to a temperature higher than the ambient temperature, causing a large thermal expansion. In a magnetic head slider of a type of thermally-assisted magnetic recording provided with a heater, relatively large range of the air bearing surface is expanded toward the recording medium by the magnetic head slider being thermally-expanded by the heater, and also this large expansion is partially further protruded by the thermal-expansion of the plasmon generator. In the present specification, the relatively large range of the expansion on the air bearing surface is referred to as a first protrusion; and a limited range of a protrusion that is protruded from the first protrusion is referred to as a second protrusion.

In the case of a conventional magnetic head slider provided with no thermally-assisted head, the second protrusion does not occur in principle. Therefore, knowing a protrusion height of the first protrusion or a separation distance between the first protrusion and the recording medium is enough for detecting a separation distance between the magnetic head slider and the recording medium. Because the first protrusion occurs in the relatively large range, the first protrusion can be measured by a conventional technique. On the other hand, in the case of the magnetic head slider of the type of thermally-assisted magnetic recording provided with the heater, the second protrusion that is a portion most protruding on the air bearing surface occurs by the thermal expansion of the plasmon generator, and its range is limited. Therefore, it is impossible to detect with a sufficient accuracy by the conventional technique.

It is objectives of the present invention to provide a method of detecting a protrusion height on the air bearing surface, during operation, of the magnetic head slider including the magnetic recording part of a thermally-assisted type.

SUMMARY OF THE INVENTION

According to one embodiment of the present invention, a method is provided for detecting a protrusion height of a second protrusion from a first protrusion of a magnetic head slider including a near-field light generator that, by laser light being supplied, is thermally-expanded and that generates near-field light on an air bearing surface, wherein an incorporated heater is activated to thermally-expand the magnetic head slider so that the first protrusion is generated on the air bearing surface and the second protrusion protruding from the first protrusion is generated by the thermal expansion of the near-field light generator. The method includes: a step for preparing a recording medium to which a standard signal is written with a predetermined magnetization; a step for obtaining a relation, as a first relation, between a first spacing, which is a spacing between the first protrusion and the recording medium, and power of the heater; a step for obtaining a relation, as a second relation, between a residual magnetization of the standard signal and the power of the heater in a state where the first and second protrusions are generated by lowering the magnetization of the standard signal by heating the recording medium with the near-field light while light output of laser light is maintained to be constant and the power of the heater is varied; a step for obtaining a relation, as a third relation, between the first spacing and the residual magnetization from the first and second relations; and a step for obtaining a value of the first spacing as the protrusion height of the second protrusion from the first protrusion when the second protrusion contacts the recording medium from the third relation, the value of the first spacing being determined where an absolute value of a change rate of the residual magnetization with respect to the first spacing is less than a predetermined standard value.

In the embodiment, in the recording medium to which the standard signal is written with a predetermined magnetization, the relation between the first spacing and the residual magnetization is obtained by lowering the magnetization of the standard signal by heating the recording medium with the near-field light. Since the second protrusion is not considered in the first spacing, an actual spacing between the air bearing surface and the recording medium is smaller than the first spacing. Therefore, when the first spacing is large, the residual magnetization is in a substantially linear relation to the first spacing; on the other hand, when the first spacing is decreased by some degree to be small, the linear relation collapses so that the residual magnetization is saturated with respect to the first spacing. The saturation of the residual magnetization is a strong fact indicating that the second protrusion contacting the recording medium. From the relation between the residual magnetization and the first spacing, the first spacing can be determined when the second protrusion contacts the recording medium. The first spacing can be considered as the protrusion height of the second protrusion from the first protrusion where the second protrusion contacts the recoding medium.

According to another embodiment, a method is provided for detecting a protrusion height of a second protrusion from a first protrusion of a magnetic head slider including a near-field light generator that, by laser light being supplied, is thermally-expanded and that generates near-field light on an air bearing surface, wherein an incorporated heater is activated to thermally-expand the magnetic head slider so that the first protrusion is generated on the air bearing surface and the second protrusion protruding from the first protrusion is generated by the thermal expansion of the near-field light generator. The method includes: a step for obtaining a relation, as a first relation, between a first spacing, which is a spacing between the first protrusion and the recording medium, and power of the heater; a step for obtaining a relation, as a second relation, between a magnetization of the standard signal and the power of the heater in a state where the first and second protrusions are generated by supplying a constant magnetic flux to the recording medium from a magnetic recording part incorporated in the magnetic head slider and by writing the standard signal to the recording medium while light output of laser light is maintained to be constant and the power of the heater is varied; a step for obtaining a relation, as a third relation, between the first spacing and the magnetization of the standard signal from the first and second relations; and a step for obtaining a value of the first spacing as the protrusion height of the second protrusion from the first protrusion when the second protrusion contacts the recording medium from the third relation, the value of the first spacing being determined where an absolute value of a change rate of the magnetization with respect to the first spacing is less than a predetermined standard value.

The above and other objects, features and advantages of the present invention will become apparent from the following description with reference to the accompanying drawings which illustrate examples of the present invention.

BRIEF DESCRIPTION OF THE DRAWINGS

FIG. 4 is a flow diagram of a method according to a first embodiment;

FIG. 8 is a flow diagram of a method according to a second embodiment; and

DETAILED DESCRIPTION OF THE INVENTION

Figure 1:
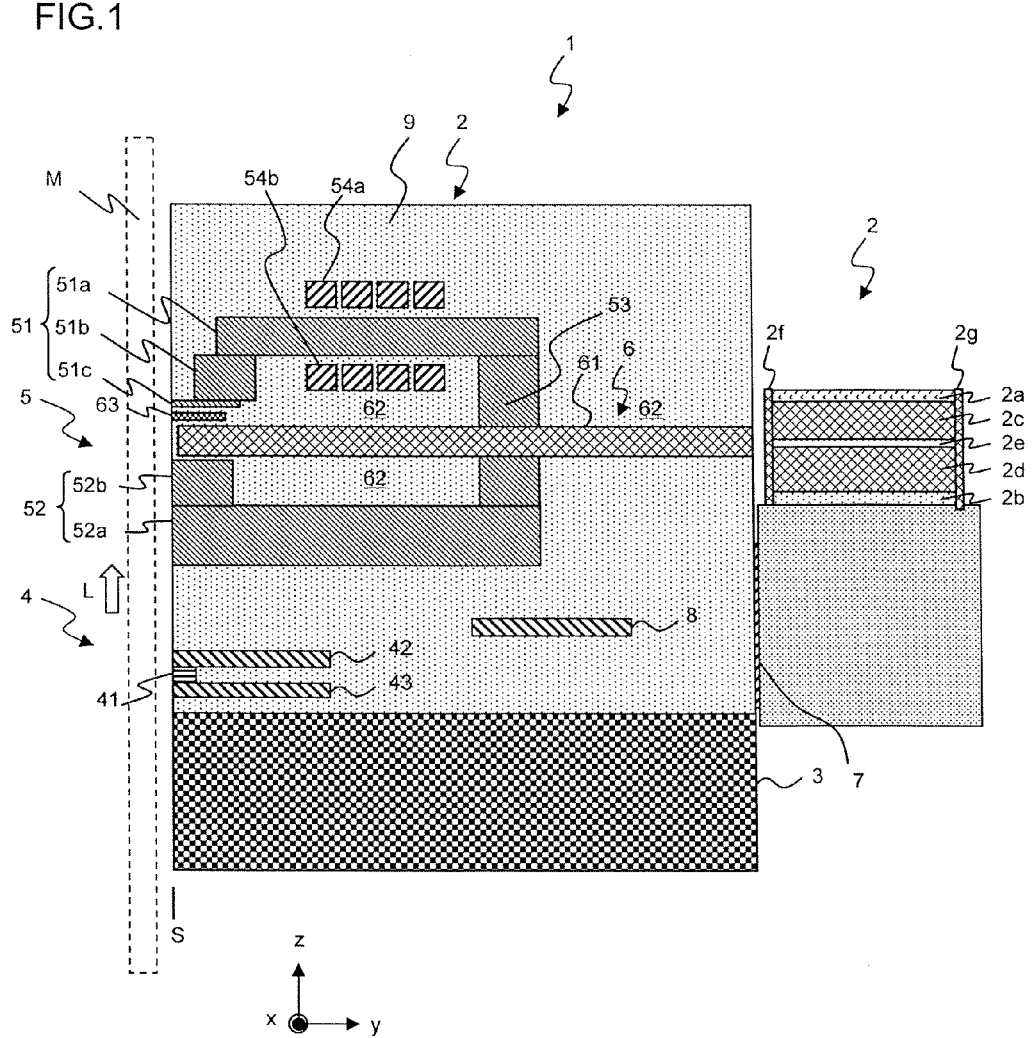
FIG. 1 is a side cross-sectional view of a magnetic head slider and a laser diode that are targets of the present invention.
Figure 2:
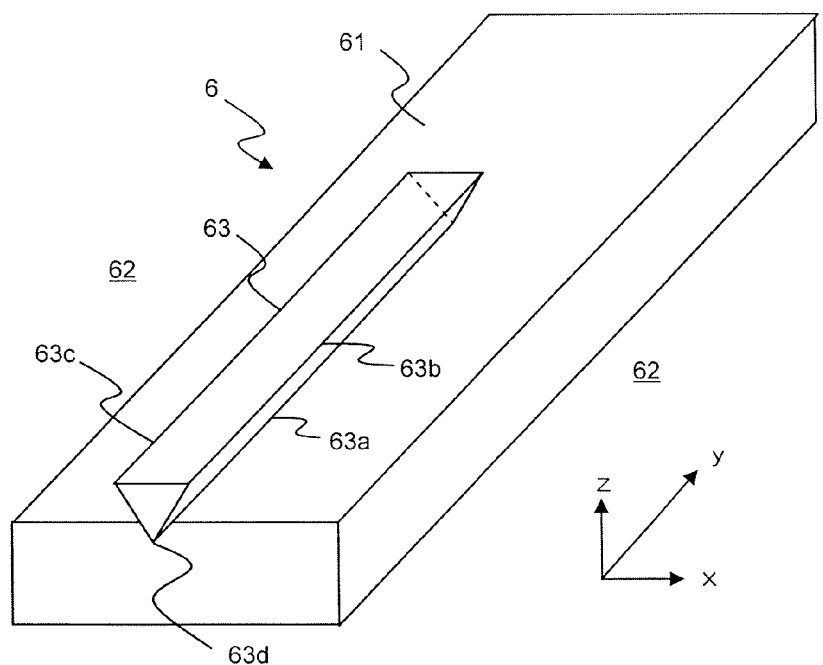
FIG. 2 is a conceptual perspective view of a near-field light generator.

Initially, a description regarding a configuration of a magnetic head slider to which the present invention is applied is given with reference to FIGS. 1 and 2. FIG. 1 is an overall cross-sectional view of a magnetic head slider and a laser diode, and FIG. 2 is a conceptual perspective view of a near-field light generator. In the present specification, a lamination direction L indicates a lamination direction in a wafer process and corresponds to z-direction in the drawings. "Upward lamination direction (upper side in the lamination direction)" indicates a direction oriented toward an overcoat layer 9 from a substrate 3, and "downward lamination direction (lower side in the lamination direction)" indicates a direction oriented toward the substrate 3 from the overcoat layer 9.

A magnetic head slider 1 has a substantially hexahedral shape, and one surface of the six outer surfaces is an air bearing surface S opposing a recording medium M. The magnetic head slider 1 includes a reproducing part 4 including a MR element 41, a magnetic recording part 5 including a main pole 51 for recording, and a near-field light generator 6 for generating a near-field light from laser light emitting from a laser diode 2 on the air bearing surface S.

The laser diode 2 is positioned on the opposite side to the air bearing surface of the magnetic head slider 1. The laser diode 2 emits laser light into a direction perpendicular to the air bearing surface S toward a core 61 of the magnetic head slider 1. The laser diode 2 is soldered to the magnetic head slider 1 by a joining layer 7.

The reproducing part 4 includes the MR element 41 that is positioned to expose an end part on the air bearing surface S, and the upper shield layer 42 and the lower shield layer 43 that are disposed to sandwich the MR element 41 from the upper and lower sides in the lamination direction. To the MR element 41, any configuration using magnetoresistive effect can be applied such as a current in plane (CIP)— gigantic magneto resistive (GMR) element in which a sense current flows in a direction (x-direction) parallel to a film surface, a current perpendicular to plane (CPP)-GMR element in which a sense current flows in a direction (z-direction) perpendicular to the film surface, and a tunneling magneto resistive (TMR) element using a tunnel effect. When the CPP-GMR element or the TMR element is applied, the upper shield layer 42 and the lower shield layer 43 are also used as electrodes for supplying a sense current.

The magnetic recording part 5 includes the main pole 51 for perpendicular magnetic recording that is disposed adjacent to a plasmon generator 63. The main pole 51 includes a first main body part 51a, a second main body part 51b, and a pole tip end part 51c, and these are formed of an alloy made of any two or three of Ni, Fe, and Co, or the like. An end part of the pole tip end part 51c is positioned on the air bearing surface S. On the lower side in the lamination direction of the main pole 51, a return shield layer 52 is disposed. The return shield layer 52 includes a first main body part 52a and a second main body part 52b, and these are also formed of an alloy made of any two or three of Ni, Fe, and Co. The main pole 51 and the return shield layer 52 are magnetically linked to each other by a contact part 53. On an upper side in the lamination direction of the main pole 51, the overcoat layer 9 is disposed.

In the periphery of the main pole 51, coils 54a and 54b are wound around the contact part 53 as a center. FIG. 1 illustrates only an air bearing surface S side portion with respect to the contact part 53. A magnetic flux is generated to the main pole 51 by a current applied to the coils 54a and 54b from an outside. The coils 54a and 54b are formed from a conductive material such as Cu, or the like. The coils 54a and 54b are disposed in a double-layered configuration in the present embodiment; however, single-layered or triple or more-layered configuration may be applicable. Also, the number of windings is four in the present embodiment; however, is not limited to this.

The magnetic flux generated within the main pole 51 is tapered as approaching the air bearing surface S, and is discharged as a minute strong magnetic flux for writing that is compatible with higher recording density toward the recording medium M from the pole tip end part 51c positioned at the air bearing surface S. The magnetic flux discharged from the pole tip end part 51c enters into the recording medium M and magnetizes each bit in the perpendicular direction. The magnetic flux changes its magnetic path into an in-plane direction (z-direction) of the recording medium M, and further changes into the perpendicular direction again in the vicinity of the return shield layer 52 to be absorbed by the return shield layer 52.

The magnetic head slider 1 is provided with the near-field light generator 6 that generates near-field light. The near-field light generator 6 includes the core 61 that can propagates laser light generated at the laser diode 2, a cladding 62 that covers the core 61 and has a smaller refractive index than the core 61, and the plasmon generator 63 that extends to the air bearing surface S as opposing a part of the core 61 and generates near-field light at the air bearing surface S. The near-field light heats a bit of the recording medium M opposing the plasmon generator 63. In another embodiment, the near-field light generator 6 may be provided with a core into which a conductive plate-shaped member that generates near-field light is incorporated. Herein, a description is given regarding the embodiment in which the plasmon generator 63 is used.

The core 61 extends from an end part opposing the laser diode 2 of the magnetic head slider 1 to the air bearing surface S or its vicinity. A cross-section of the core 61 that is orthogonal to a propagation direction (y-direction) of the laser light is rectangular. The core 61 is formed to have a width (dimension in the x-direction) larger than a thickness (dimension in the z-direction).

When the wavelength of the laser light is 600 nm, the cladding 62 can be formed of, for example, $SiO_2$, and the core 61 can be formed of, for example, $Al_2O_3$. When the cladding 62 is formed of $Al_2O_3$, the core 61 can be formed of, for example, tantalum oxide (TaOx). When the wavelength of the laser light is 800 nm, the cladding 62 can be formed of, for example, $Al_2O_3$, and the core 61 can be formed of, for example, TaOx. TaOx means an arbitrary composition of tantalum oxide and $Ta_2O_5$, TaO, and $TaO_2$ are typical; however, not limited to these.

The end part of the air bearing surface side of the core 61 extends between the main pole 51 and the return shield layer 52. The core 61 ends at the vicinity of the air bearing surface S; however, the core 61 may extend to the air bearing surface S. Although an illustration is omitted, the cladding 62 is disposed between the core 61 and the contact part 53.

The plasmon generator 63 extends to the air bearing surface S as opposing the part of the core 61. The plasmon generator 63 is formed of Au, Ag, Cu, Al, Pd, Ru, Pt, Rh or Ir, or an alloy of these metals as a primary component. As illustrated in FIG. 2, the plasmon generator 63 is a nearly-triangular-shaped metal piece including triangular cross-sections. Out of three edges 63a, 63b and 63c of the plasmon generator 63 extending in the y-direction, one edge 63a extends opposing the core 61 via the cladding 62 excluding the vicinity of the air bearing surface S. The portion of the edge 63a opposing the core 61 couples to laser light propagating through the core 61 in a surface plasmon mode to generate surface plasmon. The edge 63a propagates the generated surface plasmon to an end part 63d of the plasmon generator 63 to generate near-field light at the air bearing surface S. The plasmon generator 63 is heated by the laser light and thereby thermally-expanded. As a result, the plasmon generator 63 is elongated in its longitudinal direction (y-direction) so as to form a second protrusion P2, which will be described below, on the air bearing surface.

The laser diode 2 is an edge emitting type, and a laser diode normally used for communication, optical disk storages, or material analysis such as InP-system, GaAs-system, GaN-system or the like is usable. The laser diode 2 includes a pair of electrodes 2a and 2b, claddings 2c and 2d of a positive (P) type and a negative (N) type that are sandwiched by the pair of electrodes 2a and 2b, and an active layer 2e that is positioned between both of the claddings 2c and 2d, and cleavage surfaces 2f and 2g are formed in a reflector structure. The active layer 2e that continuously oscillates laser light is positioned on an extension of the core 61. The wavelength of the laser light to be discharged is not limited in particular; however, the wavelength in the range of 375 nm-1.7 μm can be used and the wavelength with approximately 800 nm are preferably used in particular.

A heater 8 is a heat generation element positioned inside the magnetic head slider 1. The heater 8 thermally-expands the magnetic head slider 1 by heating and thereby a first protrusion P1, which will be described later, is formed on the air bearing surface. The heater 8 includes a heat generation conductor formed of Cu, Ni, Cr or the like, and an insulating layer that covers the heat generation conductor (both of them are not illustrated), and the heat generation conductor generates heat when a current is supplied from an outside of the magnetic head slider 1. There is no particular limitation for an arrangement position of the heater 8; however, the heater 8 is preferably disposed near the middle of the main pole 51 and the MR element 41 so as to make the main pole 51 and the MR element 41 closer to the recording medium M to the extent possible by the thermal expansion of the magnetic head slider 1.

Figure 3A:
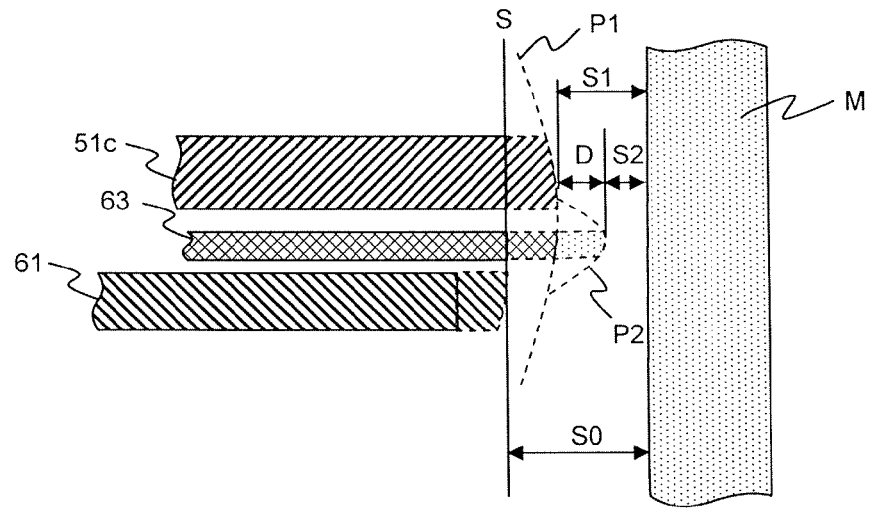
FIGS. 3A and 3B are conceptual views each illustrating a modification of an air bearing surface of the magnetic head slider.

Next, a description is given regarding a method for detecting a gap (flying height) between a protrusion part of the air bearing surface and the recording medium. As illustrated in FIG. 3A, in the magnetic head slider 1 according to the present invention, a first protrusion P1 is generated on the air bearing surface S by the thermal expansion due to the heat generation of the heater 8, and simultaneously a second protrusion P2 is generated from the first protrusion P1 by the thermal expansion of the near-field light generator (plasmon generator 63). The second protrusion P2 may be protruded from any position of the first protrusion P1, but does not need to be protruded from an apex part of the first protrusion P1. The present method detects a protrusion height D of the second protrusion P2 from the first protrusion P1 when the second protrusion P2 contacts the recording medium M. The protrusion height D is defined as a gap between the apex part of the first protrusion P1 and an apex part of the second protrusion P2.

The present method can be applied to hard disk devices in which the above-described magnetic head slider is mounted, and can be also applied to a testing device for testing the above-described magnetic head slider or recording media combined with the above-described magnetic head slider.

The present method is divided into two embodiments: a method for decreasing a magnetization of a recording medium magnetized by a predetermined magnetization by heating of near-field light and for using the residual magnetization of the recording medium (a first embodiment), and a method for magnetizing a recording medium in a constant pattern and using recorded magnetic information (second embodiment). Hereinafter, a description is given regarding both of the embodiments.

First Embodiment

With reference to the flow diagram of FIG. 4, a description regarding the first embodiment is given.

(Step S1) A recording medium M to which standard signal is written with a predetermined magnetization is prepared. In the case of a magnetic head slider that is mounted in a hard disk device, the standard signal can be recorded by a main pole of the magnetic head slider. In the case of testing the magnetic head slider or the recording medium by a testing device, the standard signal may be recorded by a recording element incorporated in the testing device or may be previously recorded by another recording device.

Figure 5A:
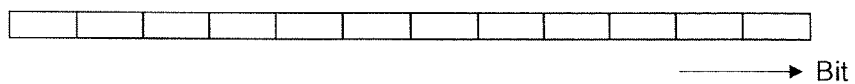
FIGS. 5A-FIG. 5C are conceptual views each illustrating a magnetization of a recording medium.
Figure 5B:
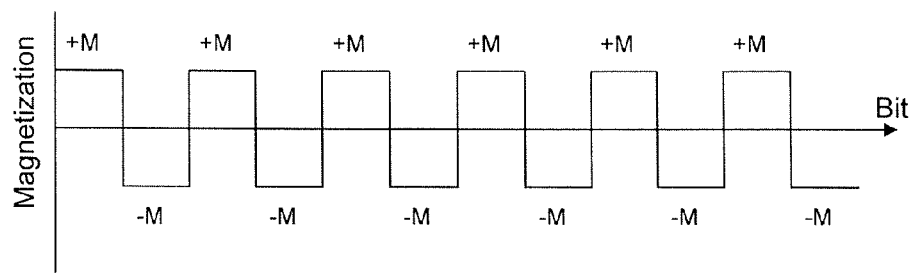

FIG. 5A schematically illustrates an alignment pattern of bits of the recording medium M to which the standard signal is written. Herein, the standard signal is written to bits aligned along one track; however, the range of bits to which the standard signal is written is not limited to this. FIG. 5B schematically illustrates magnetizations of the respective bits illustrated in FIG. 5A. The horizontal axis indicates the bit and the vertical axis indicates the magnetization of each bit. Herein, a magnetization pattern where directions of magnetizations are inverted one bit by one bit is illustrated; however, the magnetization pattern is not limited to this. The magnetization of each bit is +M or −M. Also, in the present embodiment, a plural times of operations are performed (steps S2 and S3) while varying power of the heater 8; only one bit may be targeted in each time of the operations, or plural bits may be also targeted to average obtained measured result (output voltage and residual magnetization of the MR element 41).

Figure 6:
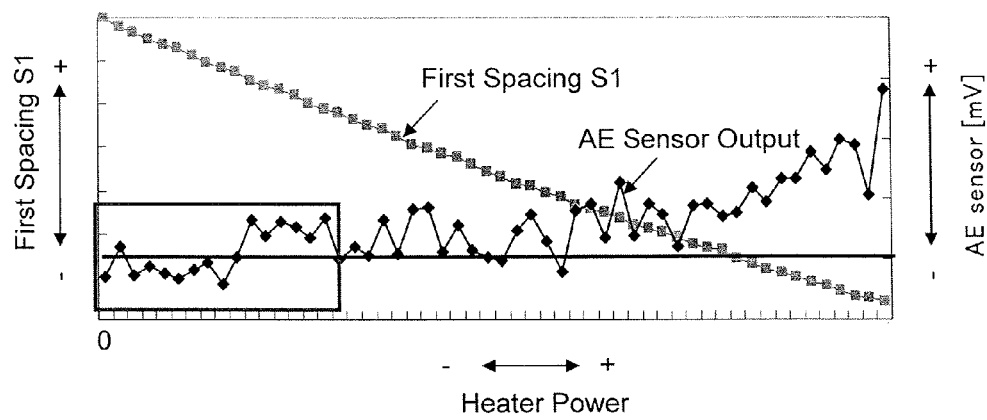
FIG. 6 is a graph illustrating a relation among the heater power, the first spacing, and the acoustic emission (AE) sensor output.

(Step S2) A relation (first relation) between the spacing, which is the first spacing 51 between the first protrusion P1 and the recording medium M, and the power of the heater 8 is obtained. FIG. 6 illustrates one example of the first relation. Specifically, the heater 8 incorporated in the magnetic head slider 1 is activated to thermally-expand the magnetic head slider 1, and thereby the first protrusion P1 is generated on the air bearing surface S. The MR element 41 is activated in this state to detect the standard signal written in the recording medium M as output voltage of the MR element 41. By repeating the same operation varying the power of the heater 8, a relation between the output voltage of the MR element 41 and the power of the heater 8 can be obtained.

When the power of the heater 8 varies, the amount of the thermal expansion of the magnetic head slider 1 varies. As a result, the height of the first protrusion P1 varies, and thereby the first spacing S1 varies. The larger the first spacing 51 is, the smaller the output voltage of the MR element 41 is. The smaller first spacing 51 is, the larger the output voltage of the MR element 41 is. A relation between the first spacing 51 and the output voltage of the MR element 41 can be previously obtained by an experiment or the like. Therefore, by converting the output voltage of the MR element 41 to the first spacing S1 using the predetermined formula for conversion, the relation (first relation) between the first spacing S1 and the power of the heater 8 can be obtained.

It is preferred to perform the above-described operation until the first protrusion P1 contacts the recording medium M. It is possible to detect that the first protrusion P1 contacts the recording medium M with, for example, an acoustic emission (AE) sensor incorporated in the magnetic head slider. FIG. 6 illustrates a relation between the heater power and the AE sensor. The AE sensor includes a piezoelectric element to detect an elastic wave propagating inside the magnetic head slider 1 and to output a variation of amplitude of the elastic wave as voltage. The magnetic head slider 1 receives a minute oscillation due to air resistance or the like even during its performance so that the elastic wave is generated inside thereof. However, when the magnetic head slider 1 contacts the recording medium M due to an increase of the heater power, an elastic wave with a large oscillation is generated. The AE sensor can detect the contact of the magnetic head slider 1 to the recording medium M as a rapid increase of the output voltage. In one example, an average value (average value in the range surrounded with the frame in FIG. 6) of the output voltage of the AE sensor when the heater power is small is obtained; then, it can be determined as a collision has occurred when a threshold value obtained by multiplying the average value by a predetermined power exceeds the output voltage.

(Step S3) While light output of laser light is maintained to be constant and the power of the heater 8 is varied, a magnetization of the standard signal is lowered by heating the recording medium M with near-field light. As a result, a residual magnetization of the standard signal remains in the recording medium M. By detecting this residual magnetization, a relation (second relation) between the residual magnetization of the standard signal and the heater power in a state where the first and second protrusions are generated is obtained. The residual magnetization of the standard signal can be detected as an output voltage of the MR element 41 incorporated in the magnetic head slider 1. The present step includes several phases which are simultaneously executed;

however, for the sake of expediency, a description is given divided into first-third substeps S3A-S3C.

(First Substep S3A) The heater 8 incorporated in the magnetic head slider 1 is activated to thermally-expand the magnetic head slider 1, and thereby the first protrusion P1 is generated on the air bearing surface.

(Second Substep S3B) Laser light is supplied to the plasmon generator 63 (near-field light generator) to generate near-field light, and the second protrusion P2 protruding from the first protrusion P1 due to the resulting of the thermal expansion of the plasmon generator 63 is generated.

(Third substep S3C) The recording medium M is heated with near-field light to lower a magnetization in a region, to which the standard signal is written, of the recording medium M.

Figure 3B:
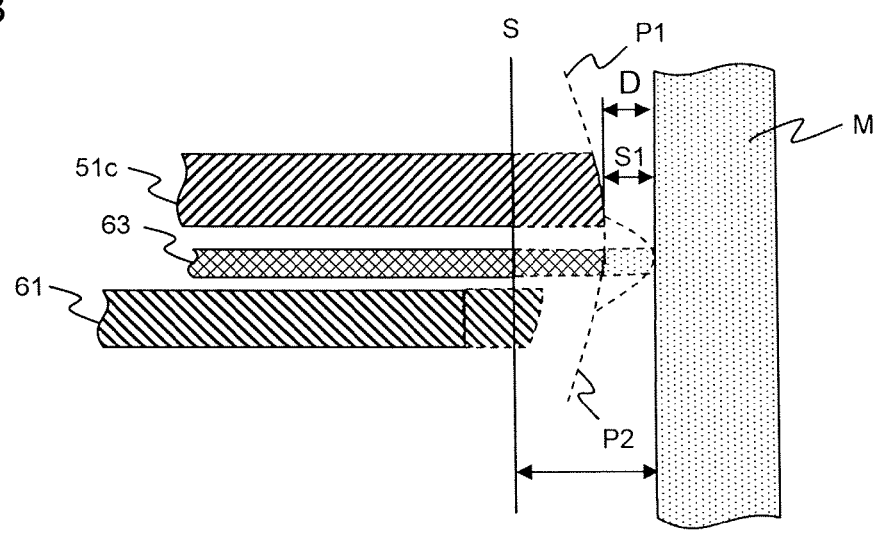

FIGS. 3A and 3B illustrate states of the air bearing surface S obtained at the above-described first and second substeps S3A and S3B. Because the first substep S3A is performed by the heating of the heater 8, the air bearing surface S expands in a wide range so that the first protrusion P1 can be obtained. On the other hand, in the second substep S3B, because the plasmon generator 63 thermally deforms due to heat generation of the plasmon generator 63 itself, the expansion of the air bearing surface S is generated in a limited region near the plasmon generator 63. The second protrusion P2 obtained due to the resulting of the thermal deformation of the plasmon generator 63 protrudes from a portion of the first protrusion P1 further toward the recording medium M. An apex part of the second protrusion P2 is the portion of the air bearing surface S that is closest to the recording medium M.

In the third substep S3C, the recording medium M is heated by the near-field light generated at the plasmon generator 63. When the recording medium M is heated, the regularity of magnetic moment is gradually lost; therefore, the magnetization in the heated region is lowered.

A unit step consisting of the above-described substeps S3A-S3C is repeated a plural times as increasing the power of the heater 8. When the power of the heater 8 increases, the thermal expansion of the magnetic head slider 1 progresses, and the first protrusion P1 entirely moves toward the recording medium M. On the other hand, because the temperature of the plasmon generator 63 mainly depends on the light output of the laser light, the temperature of the plasmon generator 63 does not significantly varies even when the power of the heater 8 is increased. Therefore, the second protrusion P2 moves toward the recording medium M by the distance that the first protrusion P1 moves while almost maintaining the shape. As a result, the recording medium M receives even greater thermal amount from the plasmon generator 63, and thereby the residual magnetization further lowers.

Figure 5C:
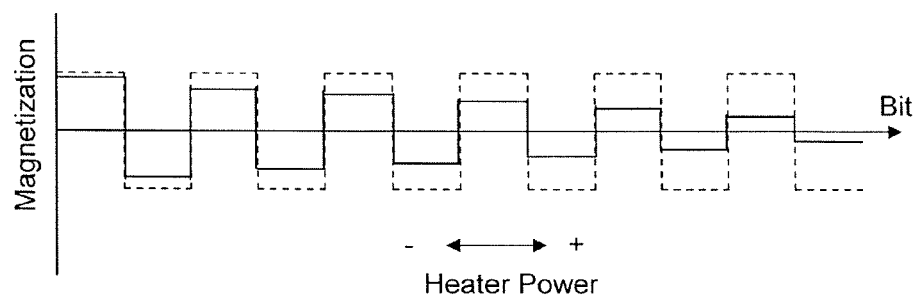

After the above-described unit step is repeated a plural times varying the heater power, the residual magnetization of the bit to which the standard signal of the recording medium M is recorded is detected. Thereby, the relation (second relation) between the residual magnetization of the standard signal and the power of the heater 8 in the state where the first and second protrusions are generated can be obtained. FIG. 5C schematically illustrates the second relation. Herein, a case is illustrated where each unit step is performed targeting only one bit. The broken line indicates the original magnetization (+M or −M) of each bit and the solid line indicates the residual magnetization. The righter side the bit is located on, the greater the power of the heater 8 is and the smaller the residual magnetization is.

The residual magnetization is detected as the output voltage of the MR element 41 of the magnetic head slider 1. Specifically, by letting a sense current flow in the MR element 41, the output voltage corresponding to the residual magnetization of an appropriate bit can be obtained. In other word, what actually to be obtained is the relation between the output voltage of the MR element 41 and the power of the heater 8. The output voltage to be obtained here is the magnetization of the standard signal weakened at the third substep S3C, which is, in other words, the output voltage corresponding to the residual magnetization, not the output voltage of the standard signal initially recorded to the recording medium M.

The detection of the output voltage can be performed in each unit step; however, it is preferred to perform in a lump when the power of the heater 8 (and of the laser diode 2 preferably) has been set to zero after the unit steps finished. This is because activating the MR element 4 while the heater 8 is under processing makes an accurate detection of the output voltage corresponding to the residual magnetization difficult because the protrusion height of the first protrusion that is the spacing between the MR element 41 and the recording medium M are different by every unit step.

Figure 7A:
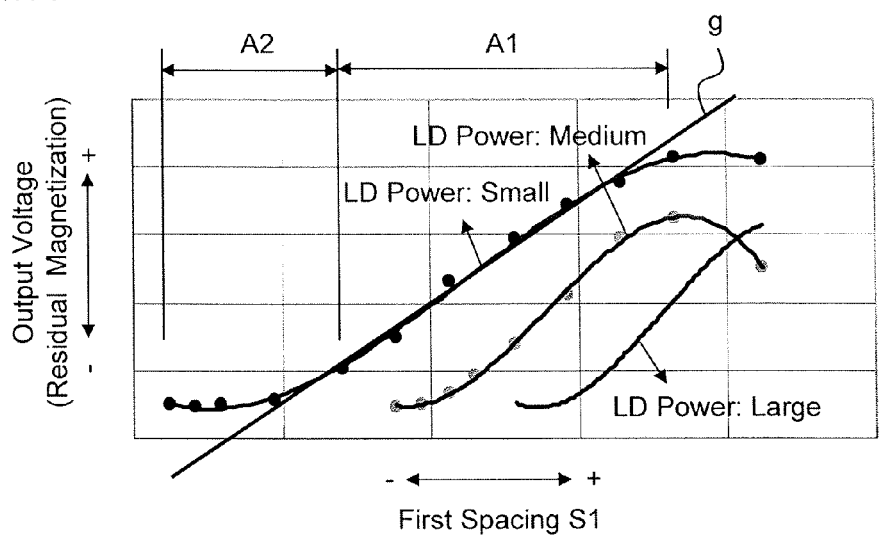
FIGS. 7A and 7B are graphs each illustrating a relation between the first spacing and the output voltage of a MR element.

(Step S4) From the first and second relations, a relation (third relation) between the first spacing 51 and the residual magnetization is obtained. FIG. 7A exemplifies this relation. The horizontal axis of the graph indicates the first spacing 51, and the vertical axis indicates the output voltage of the MR element 41 corresponding to the residual magnetization of the recording medium M. Here, examples of three cases with different voltage of the laser diode (LD), which is the light intensity of laser light, are illustrated. In all of the cases, the right edge portion of the graph illustrates the spacing S0 (see FIG. 3A) between the mostly flat air bearing surface S and the recording medium M because the heater 8 is not activated. When the heater 8 is activated (the first substep S3A), the output voltage gradually declines although there are variations among the cases. When the heater power is further increased maintaining the voltage of the laser diode 2 at the constant value, the output voltage nearly linearly declines. FIG. 3A illustrate the state at this point where both the first protrusion P1 and the second protrusion P2 do not reach the surface of the recording medium M, and the output voltage nearly linearly declines. Further, as the heater power is being increased, the output voltage is saturated and thereby stabilized at approximately constant value.

(Step S5) From the third relation, the value of the first spacing 51 when the absolute value of change rate of the residual magnetization (output voltage of the MR element 41) with respect to the first spacing S1 is less than the predetermined standard value is obtained as a protrusion height D of the second protrusion P2 from the first protrusion P1 when the second protrusion P2 contacts the recording medium M. FIG. 3B illustrates the state where the second protrusion P2 reaches the surface of the recording medium M. What is obtained in the this step is the value of the first spacing S1 in the state illustrated in FIG. 3B, which is, in other word, the protrusion height D of the second protrusion P2 from the first protrusion P1.

In the graph of FIG. 7A, the output voltage is saturated although the first spacing S1 is not zero. In this step, this type of shape of the graph is used based on the following thought.

As described above, illustrated in the graph of FIG. 7A is the spacing S1 of the first protrusion P1 with the recording medium M but the spacing S2 of the second protrusion P2 with the recording medium M. On the other hand, the second protrusion P2 reaches the recording medium M before the spacing S1 between the first protrusion P1 and the recording medium M becomes zero. Once the second protrusion P2 reaches the recording medium M, a tip end part of the plasmon generator 63 remains staying near the surface of the recording medium M even if the power of the heater 8 in further increased. During this while, the first protrusion P1 keeps approaching the recording medium M; however, the ability for the plasmon generator 63 to reduce the magnetization of the recording medium M is saturated, and thereby the residual magnetization does not vary. Therefore, the saturation shape appears on the graph.

It can be understood that the saturation shape gradually appears as the tip end part of the plasmon generator 63 approaches the recording medium M. Therefore, it can be understood that the tip end part of the plasmon generator 63 reaches the recording medium M when the first spacing S1 is further reduced after the saturation shape appears, but when the saturation shape initially appears. So, in the present embodiment, the value of the spacing S1 when the absolute value (|dV/dS1|) of change rate of the output voltage V with respect to the spacing S1 between the first protrusion P1 and the recording medium M is less than the predetermined standard value is obtained as a protrusion height D of the second protrusion P2 with respect to the first protrusion P1 when the second protrusion P2 contacts the recording medium M.

Figure 7B:
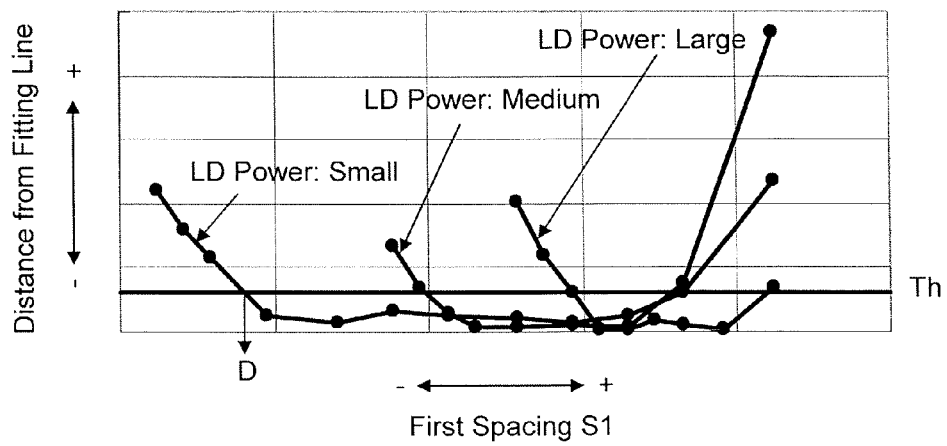

The protrusion height D can be obtained as follows, for example. Initially, the horizontal axis is divided into the area A1 where the output voltage V can be approximated as a linear function g of the spacing S1 and the area A2 where the output voltage V cannot be approximated. Next, the linear function g is calculated based on the graph. For this calculation, known statistics approaches such as least squares method or the like can be used. Next, as illustrated in FIG. 7B, a difference (the vertical axis of the graph in FIG. 7B) between the output voltage V and the linear function g is obtained. The spacing S1 when the difference exceeds the constant threshold Th in the area A2 (area with smaller spacing 51 than the area that can be approximated as the linear function) where the output voltage V cannot be approximated as the linear function is obtained as the protrusion height D.

Second Embodiment

A description regarding a second embodiment will be given with reference to the flow diagram in FIG. 8. The different points from the first embodiment are mainly explained herein, and it is noted to refer the first embodiment for points without explanation.

(Step S1') The relation (first relation) between the spacing (first spacing S1) between the first protrusion P1 and the recording medium M, and the power of the heater 8 is obtained. This step is the same as the step S2 of the first embodiment. In the first embodiment, the standard signal of a predetermined magnetization should be previously written to the recording medium (the step S1) for its following steps; however, in the present embodiment, this step is unnecessary. In the present embodiment, the step S1' may be executed after the step S1 of the first embodiment is executed, or the first relation that has already obtained regarding the magnetic head slider, which is an experimental target, may be applied without any change.

(Step S2') While maintaining the light output of the laser light constant as varying the power of the heater 8, a constant magnetic flux is supplied from the magnetic recording part 5 incorporated in the magnetic head slider 1, and thereby the standard signal is written to the recording medium M. Thereby, a relation (second relation) between the magnetization of the standard signal and the power of the heater 8 in the state where the first and second protrusions are generated can be obtained. The magnetization of the standard signal can be detected as an output voltage of the MR element 41 incorporated in the magnetic head slider 1, a signal/noise ratio of the output signal of the MR element 41, or a bit error rate of the output signal of the MR element 41.

Basic operations are as follows.
(First Substep S2A') The heater 8 incorporated in the magnetic head slider 1 is activated to thermally-expand the magnetic head slider 1, and thereby the first protrusion P1 is generated on the air bearing surface S.
(Second Substep S2B') Laser light is supplied to the plasmon generator 63 (near-field light generator) to generate near-field light, and the second protrusion P2 protruding from the first protrusion P1 due to the resulting of the thermal expansion of the plasmon generator 63 is generated.
(Third Substep S2C') The standard signal is written to the recording medium M with the main pole 51 of the magnetic recording part 5 with a constant magnetic flux. There is no particular limitation for patterns of the magnetic flux; however, a pattern where the direction of the magnetic flux reverses per every bit as illustrated in FIG. 5B (the vertical axis of FIG. 5B is changed to magnetic flux) can be considered as one example.

The first substep S2A' and the second substep S2B' are the same as the first substep S3A and the second substep S3B in the first embodiment. After the above-described unit step is repeated a plural times varying the power of the heater 8, the magnetization of the bit where the standard signal of the recording medium M is recorded (the output voltage of the MR element 41, a signal/noise ratio of the output signal of the MR element 41, or a bit error rate of the output signal of the MR element 41) are detected. Thereby, the relation (second relation) between the magnetization of the standard signal and the power of the heater 8 in the state where the first and second protrusions are generated can be obtained.

The present step is similar to the step S3 of the first embodiment.

However, in the first embodiment, the magnetization of the standard signal is lowered at the third substep S3C; on the other hand, in the present embodiment, the standard signal is written at the third substep S2C'.

Figure 9A:
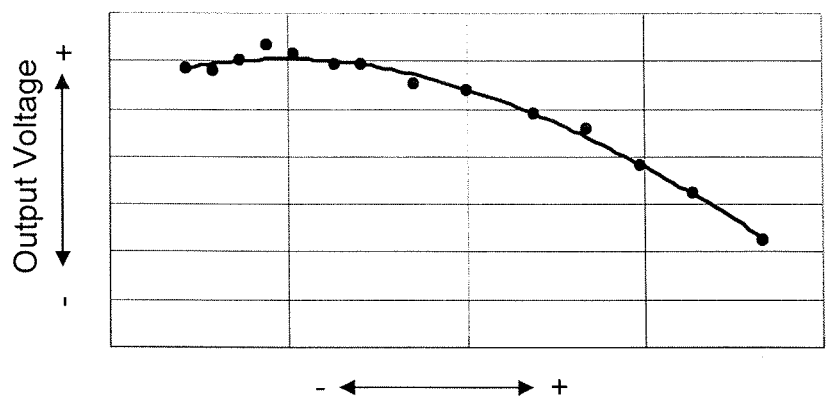
FIGS. 9A-9C are graphs each illustrating a relation between the first spacing and the evaluation indicator.

(Step S3') From the first and second relations, a relation (third relation) between the first spacing 51 and the magnetization is obtained. FIG. 9A illustrates a relation between the first spacing 51 and the output voltage of the MR element 41. Because the distance from the main pole 51 and the plasmon generator 63 to the recording medium M become smaller when the first spacing 51 is smaller, the standard signal is written to the recording medium M with even greater magnetization even when the same light intensity and the same magnetic flux are supplied. As a result, when the MR element 41 reads it, even greater output voltage can be obtained. As the first spacing 51 becomes even smaller, the magnetic flux that the recording medium M receives keeps increasing because the main pole 51 does not contact the recording medium M; however, the heating ability using near-field light becomes saturated because the plasmon generator 63 contacts the recording medium M. Therefore, the magnetization of the recording medium M becomes saturated and the output voltage as well becomes saturated.

Figure 9B:
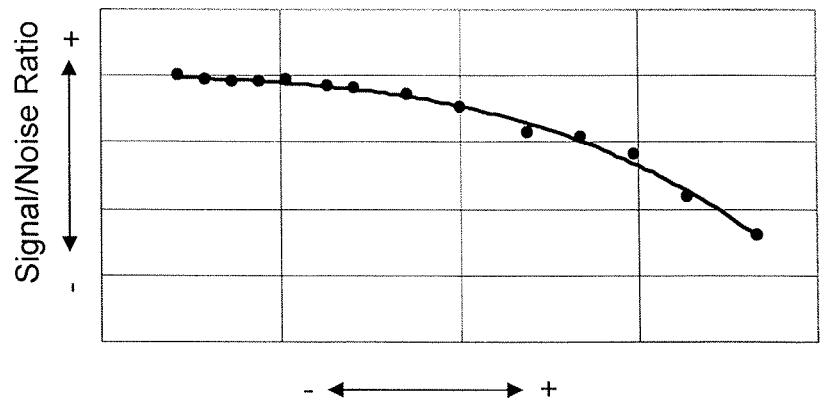

FIG. 9B illustrates a relation between the first spacing 51 and the signal/noise ratio of the MR element. From similar reasons, because the magnetization of the recording medium M becomes saturated when the first spacing 51 becomes smaller, the signal/noise ratio of the MR element also becomes saturated.

Figure 9C:
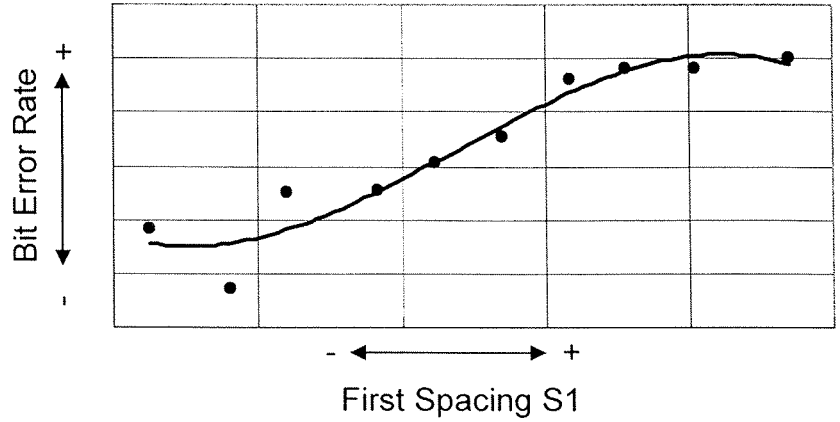

FIG. 9C illustrates a relation between the first spacing S1 and the bit error rate of the MR element. The bit error rate is an indicator showing a rate of signal that is not properly reproduced when signal with "1" or "0" is written to the recording medium M and then the MR element 41 reads the signal. In order to use the bit error rate as the indicator, it is needed to perform writing to a plurality of bits with a constant heater power. The first spacing S1 and the bit error rate have a positive correlation that is reversed to FIGS. 9A and 9B because the bit error rate is lowered when the first spacing S1 is smaller. Because the magnetization of the recording medium M becomes saturated when the first spacing S1 is smaller, the bit error rate becomes saturated.

(Step S4') From the third relation, the value of the first spacing S1 when the absolute value of change rate of the magnetization (output voltage or the like of the MR element 41) of the recording medium M with respect to the first spacing S1 is less than the predetermined standard value is obtained as a protrusion height D of the second protrusion P2 from the first protrusion P1 when the second protrusion P2 contacts the recording medium M. The specific calculation method for the protrusion height D of the second protrusion P2 is similar to the step S5 of the first embodiment.

While preferred embodiments of the present invention have been shown and described in detail, and it is to be understood that variety of changes and modifications may be made without departing from the spirit of scope of the attached claims or its scope.

What is claimed is:

1. A method for detecting a protrusion height of a second protrusion from a first protrusion of a magnetic head slider including a near-field light generator that, by laser light being supplied, is thermally-expanded and that generates near-field light on an air bearing surface, wherein an incorporated heater is activated to thermally-expand the magnetic head slider so that the first protrusion is generated on the air bearing surface and the second protrusion protruding from the first protrusion is generated by the thermal expansion of the near-field light generator, the method comprising:
a step for preparing a recording medium to which a standard signal is written with a predetermined magnetization;
a step for obtaining a relation, as a first relation, between a first spacing, which is a spacing between the first protrusion and the recording medium, and power of the heater;
a step for obtaining a relation, as a second relation, between a residual magnetization of the standard signal and the power of the heater in a state where the first and second protrusions are generated by lowering the magnetization of the standard signal by heating the recording medium with the near-field light while light output of laser light is maintained to be constant and the power of the heater is varied;
a step for obtaining a relation, as a third relation, between the first spacing and the residual magnetization from the first and second relations; and
a step for obtaining a value of the first spacing as the protrusion height of the second protrusion from the first protrusion when the second protrusion contacts the recording medium from the third relation, the value of the first spacing being determined where an absolute value of a change rate of the residual magnetization with respect to the first spacing is less than a predetermined standard value.

2. The method according to claim 1, wherein the residual magnetization of the standard signal is detected as an output voltage of a reproducing element incorporated in the magnetic head slider.

3. The method according to claim 1, wherein the first relation is obtained by detecting the standard signal as an output voltage of a reproducing element incorporated in the magnetic head slider while the power of the heater is varied and by converting a detected output voltage to the first spacing.

4. The method according to claim 1, wherein, when the first spacing is divided into an area where the residual magnetization of the standard signal can be approximated as a linear function of the first spacing and another area where the residual magnetization of the standard signal cannot be approximated as a linear function,
a protrusion height of the second protrusion from the first protrusion is obtained as a value of the first spacing, the first spacing being determined where a difference between the residual magnetization of the standard signal in the area where the residual magnetization of the standard signal cannot be approximated as the linear function and the linear function exceeds a constant threshold.

5. The method according to claim 1, wherein the near-field light generator includes a core through which laser light emitted from a laser diode can propagate and a plasmon generator that extends along the core to the air bearing surface while opposing a portion of the core and that generates near-field light on the air bearing surface.

6. A method for detecting a protrusion height of a second protrusion from a first protrusion of a magnetic head slider including a near-field light generator that, by laser light being supplied, is thermally-expanded and that generates near-field light on an air bearing surface, wherein an incorporated heater is activated to thermally-expand the magnetic head slider so that the first protrusion is generated on the air bearing surface and the second protrusion protruding from the first protrusion is generated by the thermal expansion of the near-field light generator, the method comprising:
a step for obtaining a relation, as a first relation, between a first spacing, which is a spacing between the first protrusion and the recording medium, and power of the heater;
a step for obtaining a relation, as a second relation, between a magnetization of the standard signal and the power of the heater in a state where the first and second protrusions are generated by supplying a constant magnetic flux to the recording medium from a magnetic recording part incorporated in the magnetic head slider and by writing the standard signal to the recording medium while light output of laser light is maintained to be constant and the power of the heater is varied;
a step for obtaining a relation, as a third relation, between the first spacing and the magnetization of the standard signal from the first and second relations; and
a step for obtaining a value of the first spacing as the protrusion height of the second protrusion from the first protrusion when the second protrusion contacts the recording medium from the third relation, the value of the first spacing being determined where an absolute value of a change rate of the magnetization with respect to the first spacing is less than a predetermined standard value.

7. The method according to claim 6, wherein
the magnetization of the standard signal is detected as an output voltage of a reproducing element incorporated in a magnetic head slider, a signal/noise ratio of an output signal of the reproducing element, or a bit error rate of an output signal of the reproducing element.

8. The method according to claim 6, wherein
the first relation is obtained by detecting the standard signal as the output voltage of a reproducing element incorporated in the magnetic head slider while the power of the heater is varied and by converting a detected output voltage to the first spacing.

9. The method according to claim 6, wherein,
when the first spacing is divided into an area where the magnetization of the standard signal can be approximated as a linear function of the first spacing and another area where the magnetization of the standard signal cannot be approximated as the linear function,
a protrusion height of the second protrusion from the first protrusion is obtained as a value of the first protrusion, the first spacing being determined there a difference between the magnetization of the standard signal in the area where cannot be approximated and the linear function exceeds a constant threshold.

10. The method according to claim 6, wherein
the near-field light generator includes a core through which laser light emitted from a laser diode can propagate and a plasmon generator that extends along the core to the air bearing surface while opposing a portion of the core and that generates near-field light on the air bearing surface.

* * * * *